(12) United States Patent
Six et al.

(10) Patent No.: US 11,719,564 B2
(45) Date of Patent: Aug. 8, 2023

(54) FOOD DOSING IMPLEMENT

(71) Applicant: MARS, INCORPORATED, McLean, VA (US)

(72) Inventors: Thierry Six, Aimargues (FR); Benedicte Garzino, Aimargues (FR)

(73) Assignee: MARS, INCORPORATED, Mclean, VA (US)

( * ) Notice: Subject to any disclaimer, the term of this patent is extended or adjusted under 35 U.S.C. 154(b) by 145 days.

(21) Appl. No.: 17/421,078

(22) PCT Filed: Jan. 8, 2020

(86) PCT No.: PCT/US2020/012723
§ 371 (c)(1),
(2) Date: Jul. 7, 2021

(87) PCT Pub. No.: WO2020/146488
PCT Pub. Date: Jul. 16, 2020

(65) Prior Publication Data
US 2022/0113176 A1 Apr. 14, 2022

Related U.S. Application Data

(60) Provisional application No. 62/790,727, filed on Jan. 10, 2019.

(51) Int. Cl.
*G01F 19/00* (2006.01)
*A01K 5/00* (2006.01)

(52) U.S. Cl.
CPC .............. *G01F 19/002* (2013.01); *A01K 5/00* (2013.01)

(58) Field of Classification Search
CPC ................................ G01F 19/002; A01K 5/00
See application file for complete search history.

(56) References Cited

U.S. PATENT DOCUMENTS

| | | | | |
|---|---|---|---|---|
| 2,826,078 A | * | 3/1958 | Setecka | G01F 19/002 D10/46.2 |
| 2,854,849 A | * | 10/1958 | Setecka | G01F 19/002 73/429 |

(Continued)

FOREIGN PATENT DOCUMENTS

JP 3179879 U 11/2012

OTHER PUBLICATIONS

International Search Report dated Apr. 3, 2020 in International Application No. PCT/US2020/012723.

*Primary Examiner* — Jamel E Williams
(74) *Attorney, Agent, or Firm* — Baker Botts L.L.P.

(57) ABSTRACT

A pet food implement (100) having a container (200) to measure an amount of pet food based on a weight measurement of a pet and a weight management plan, the container (200) having a side (215, 220) with graduated markings (230) corresponding to weight measurements for pets. The container (200) further includes a selectively adjustable wall (300) that defines an intermediate predetermined volume of the container (200) corresponding to an amount of pet food suitable for a pet with a certain weight on a predetermined weight management plan; and a handle (400) coupled to the wall (300) to selectively adjust the wall (300) along the side of the container (200) to define the intermediate predetermined volume, the handle (400) aligning the wall (300) proximate one of the graduated markings (230).

18 Claims, 9 Drawing Sheets

(56) References Cited

U.S. PATENT DOCUMENTS

| | | | | |
|---|---|---|---|---|
| 3,798,975 | A | * | 3/1974 | Horst .................... G01F 19/002 |
| | | | | D10/46.2 |
| 5,325,717 | A | * | 7/1994 | Robbins ................. G01F 19/00 |
| | | | | 73/426 |
| 6,125,699 | A | * | 10/2000 | Molenaar .............. G01F 19/002 |
| | | | | 73/429 |
| 8,336,377 | B2 | * | 12/2012 | Robbins ............... G01F 19/002 |
| | | | | 73/426 |
| 2016/0000036 | A1 | | 1/2016 | Cornwell, Jr. et al. |
| 2019/0128722 | A1 | * | 5/2019 | Caldwell ............... G01F 19/002 |

\* cited by examiner

| Dog Weight<br>Poids du chien<br>Peso del perro | Normal activity<br>Activité normale<br>Actividad normal | | High activity<br>Activité elevée<br>Actividad alta | |
|---|---|---|---|---|
| | cups<br>tasses<br>tazas | grams<br>grammes<br>gramos | cups<br>tasses<br>tazas | grams<br>grammes<br>gramos |
| 2.2lb(1kg) | 3/8 | 28 | 3/8 | 31 |
| 3.3lb(1.5kg) | 3/8 | 37 | 1/2 | 43 |
| 4.4lb(2kg) | 1/2 | 46 | 5/8 | 53 |
| 5.5lb(2.5kg) | 5/8 | 55 | 3/4 | 62 |
| 6.6lb(3kg) | 3/4 | 63 | 7/8 | 71 |
| 7.7lb(3.5kg) | 3/4 | 71 | 7/8 | 80 |

1/2 | 1/2     Water / Eau / Agua 1 cup = 8 fluid ounces = 86 grams.
1 tasse = 8 onces liquides = 86 grammes.
1 taza = 8 onzas líquidas = 86 gramos.

This is only a guide. Optimal feeding amounts may vary according to your dog's temperament, activity level and environment. If you have any questions regarding your pet's health, please contact your veterinarian.

Ceci n'est qu'un guide. Les quantités optimales peuvent varier selon le comportement de votre chien, son niveau d'activité et l'environnement. Si vous avez la moindre question concernant la santé de votre animal, merci de contacter votre vétérinaire.

Esta informacion es solamente una guía. Las cantidad ideal de alimento para su perro puede variar de acuerdo con el temperamento, el nivel de actividad y el ambiente de su perro. Si tiene alguna pregunta sobre la salud de su perro, consulte al veterinario.

FIG. 1A
PRIOR ART

FOOD DOSING IMPLEMENT

CROSS-REFERENCE TO RELATED APPLICATIONS

This application is a U.S. National Stage Patent Application under 35 U.S.C. § 371 of International Patent Application No. PCT/US2020/012723, filed on Jan. 8, 2020, which claims priority to U.S. Provisional Application No. 62/790,727, filed on Jan. 10, 2019, the contents of each which are herein incorporated by reference in their entirety.

BACKGROUND OF THE DISCLOSED SUBJECT MATTER

Field

The disclosed subject matter relates to food dosing implements and in particular, a pet food utensil.

Background

Cats and dogs are popular pets, especially in cities. Due to raising urbanization, more pets are living strictly indoors and are routinely fed on a schedule. Unfortunately, some of these pets never go outside, have limited activity, and are overweight. In fact, the leading chronic issue facing cats is obesity. Dogs often face similar issues. To overcome these issues, pet owners and caretakers often place their pets on weight loss programs to assist their pets in attaining a healthy weight. Once the pets have reached a healthy weight, caretakers can alter the food intake of the pets to place them on a maintenance plan, or rebound control.

Pet food is often sold in large quantities, such as 3-20 pound bags of food. Often, such bags do not come with portion control implements and caretakers pour the pet food from the food bag into a bowl, which can result in overfeeding pets. Alternatively, caretakers dip a pet bowl into the food bag and give a large heaping of food to their pet, also contributing to weight issues.

All pets should have proper health and nutrition including providing pets with the access to quality nutrition, water, and exercise. Accordingly, for pets on weight gaining programs, weight loss programs, rebound control or weight maintenance diet plans, the amount of food provided to the pet must be controlled for promoting healthy pets. As such, caretakers often rely upon informational cards or rationing tables to estimate the amount of food their pet should have per meal based on the pet's current weight, and then utilize an implement such as a measuring cup or scale to administer the pet food. A traditional rationing card and measuring cup are depicted in FIGS. 1A and 1B (Prior Art). Unfortunately, such two-step process can be time consuming and frustrate caretakers. Furthermore, informational cards are often misplaced or separated from the measuring cup, which often is washed and separated from the card. As such, caretakers often have to purchase a new informational card or look up the information online. Such additional steps can frustrate caretakers who have limited time.

Furthermore, the volume of current pet food measuring cups generally compensate for pets, such as cats, weighing generally between 2 to 12 kg, but these cups lack precision. Such measuring cups are graduated such as for purposes of example, every ⅛ of cup from bottom to top as shown in FIG. 1B, which impacts dosing precision. Consequently, it is more difficult to guarantee precision with such cup to ensure that the pet food corresponds to a given line on the cup. Often, caretakers have difficulty aligning the food in the cup to the correct line resulting in the overfeeding or underfeeding of pets. For example, if a dose is only ½ cup and the measuring cup can accommodate up to 2 cups, it can be difficult for the user to level off the ½ cup marking in such a large cup.

There thus remains a continued need for an efficient and economic system for pet food dispensing that addresses at least the above noted issues. The presently disclosed subject matter satisfies these and other needs.

SUMMARY

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a pet food implement, comprising, amongst other things, a container to measure an amount of pet food based on a weight measurement of a pet and a weight management plan, the container having a side with graduated markings corresponding to weight measurements for pets; a selectively adjustable wall that defines an intermediate predetermined volume of the container corresponding to an amount of pet food suitable for a pet with a certain weight on a predetermined weight management plan; and a handle coupled to the wall to selectively adjust the wall along the side of the container to define the intermediate predetermined volume, the handle aligning the wall proximate one of the graduated markings.

The disclosed subject matter further includes a method of using a pet food implement, comprising amongst other things, providing a pet food implement having a container to measure an amount of pet food based on a weight measurement of a pet and a weight management plan, the container having a side with graduated markings corresponding to weight measurements for pets, a selectively adjustable wall that defines an intermediate predetermined volume of the container corresponding to an amount of pet food suitable for a pet with a certain weight on a predetermined weight management plan; and a handle coupled to the wall; selectively adjusting the wall along the side of the container to define the intermediate predetermined volume, the handle aligning the wall proximate one of the graduated markings; and using the implement to fill the intermediate predetermined volume with pet food.

It is to be understood that both the foregoing general description and the following detailed description and drawings are examples and are provided for purpose of illustration and not intended to limit the scope of the disclosed subject matter in any manner.

The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which:

FIG. 1A and FIG. 1B are Prior Art examples of a traditional informational portion control card and traditional measuring cup for a cat.

DETAILED DESCRIPTION

Reference will now be made in detail to embodiments of the disclosed subject matter, an example of which is illustrated in the accompanying drawings. The disclosed subject matter will be described in conjunction with the detailed description of the system. The examples herein are not intended to limit the scope of the disclosed subject matter in any manner. Although reference below is to a "pet," it is to be understood that the implement according to the disclosed subject matter can be utilized for any animal from pets to zoo animals and the like.

As disclosed herein, the implement presented herein can have many benefits, such as being a "ready to use" implement for pet weight loss, weight maintenance, and weight gaining dosing plans. The implement according to the disclosed subject matter is convenient for caretakers, whether a pet owner, veterinarian, neighbor, helper, friend or the like, by providing a simple, easy tool without having to consult additional materials.

Figure 1B:
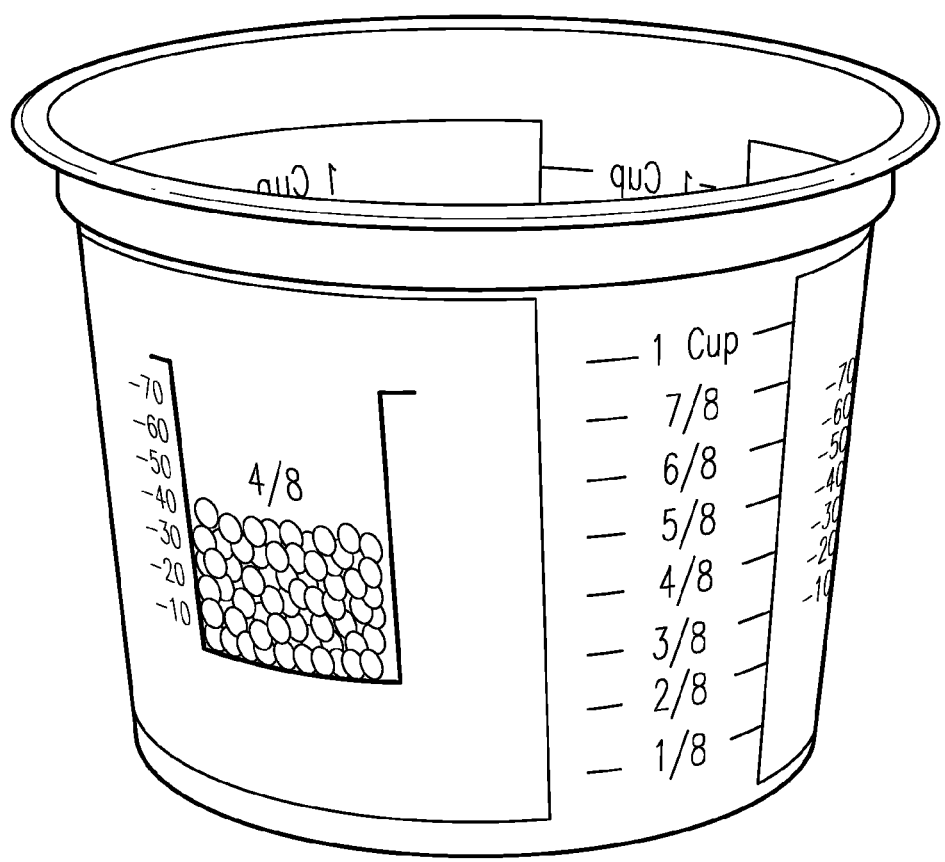
Figure 2:
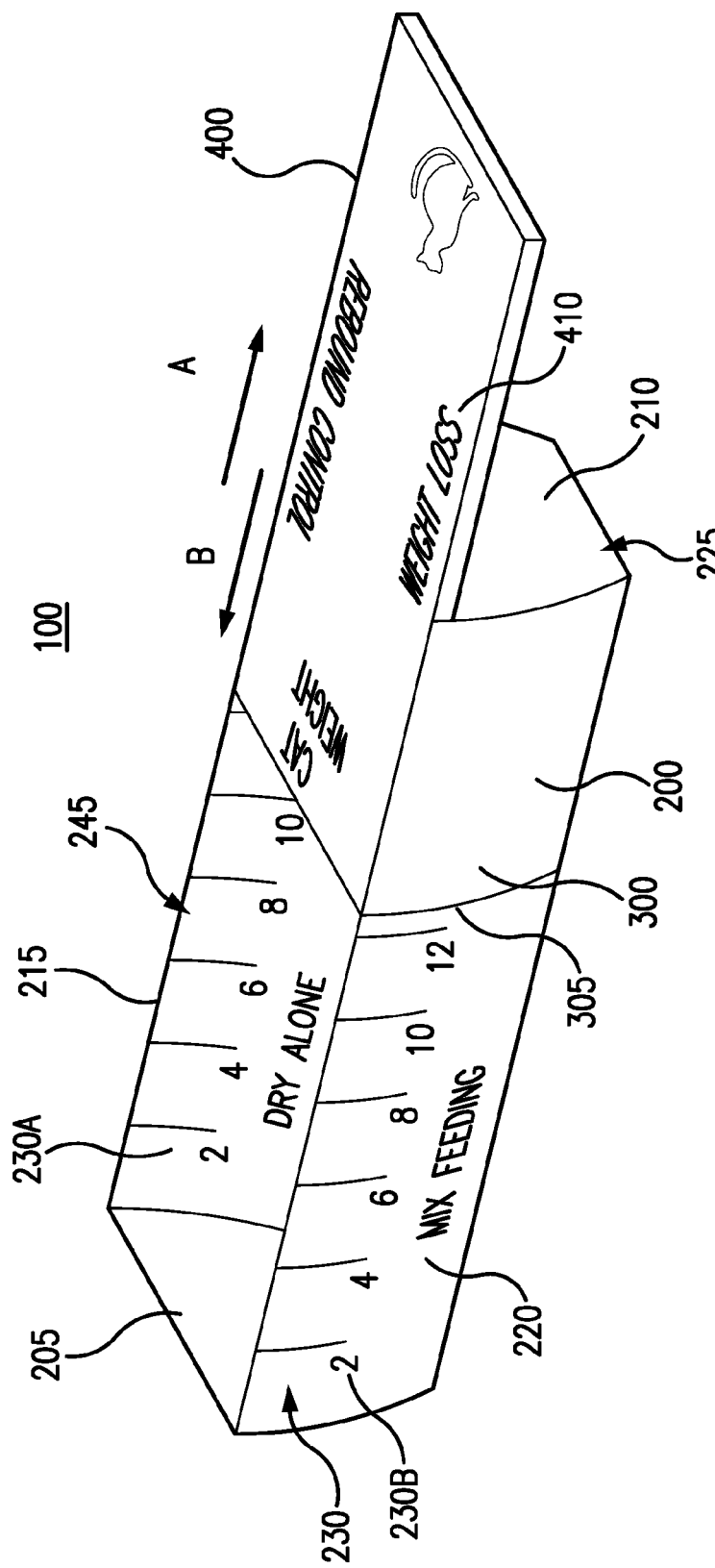
FIG. 2 is a pet food implement in a perspective view, according to the disclosed subject matter.

Solely for purpose of illustration, an embodiment of a pet food implement 100, is shown schematically in FIG. 2. Particularly, and as illustrated, the pet food implement 100 comprises a container 200, an adjustable wall 300, and a handle 400. The implement measures an amount of pet food to administer to a pet based on a current weight measurement of the pet. The amount of pet food can correspond to a meal portion for the pet.

As shown in the example of FIG. 2, the container 200 includes a front end 205, a back end 210, a first side 215, a second side 220, and a bottom 225. The container has a maximum volume as defined by the front end, back end, first side, second side, and bottom. Other configurations of the container are contemplated herein, such as but not limited to a container having a curved base with a front end and a back end. The container can have additional features such as a lip to facilitate scooping of food. In one embodiment, the front end 205 includes a spout for easy pouring.

The container 200 has at least one side with one or more graduated markings 230 corresponding to weight measurements for pets. The graduated markings can be located on the interior of the container and/or on the exterior of the container. In the example of FIG. 2, the markings are provided on both the interior and exterior of the container for each side, as further discussed herein.

The weight measurements can range from a low end (for small pets) to a higher end (for larger pets). In one example, the weight measurements range from about 2 kg to about 20 kg for a cat, or more particularly from about 2 kg to about 12 kg for standard sized cats. For a dog or larger animals, the measurements can extend beyond 20 kg, such as up to 140 kg for large dog breeds or 1,100 kg for horses. Even for the same kind of pet, the implements can be tailored to the approximate size of the pet breed. For example, implements for dogs can come in different formats such as extra small (i.e., for dogs less than 8 lbs), small (i.e., for dogs between 8-23 lbs), medium (i.e., for dogs between 23-55 pounds), large (i.e., for dogs between 55-99 pounds). and giant formats (i.e., for dogs greater than 99 pounds), or even implements that cover ranges between the different formats. Other ranges are contemplated herein that are suitable for various kinds of pets or large animals from smaller sized animals like micro pigs to larger sized animals, like horses.

Furthermore, for individualized diet plans for certain pets, the container can be individualized and customized. For example, the container can receive an attachable sticker or decal to overlay original markings on the container (or otherwise overlay an unmarked, blank container). The sticker can include specific graduation markings associated with specific pet foods and volumes as appropriate for the individual pet that is on an customized diet. Such stickers can be provided by a veterinarian administering care for the individual pet. As individualized pet food diets can vary in caloric density, the implement having an individualized sticker for the specific pet can create an easier experience for the caretaker. The implement according to the disclosed subject matter being customized to a pet's individualized diet plan further helps caretakers properly dose unique, individualized pet food best for pet nutrition. In other words, caretakers will have no ambiguity when feeding individualized pet food diets for a specific pet's size and diet plan with such customizable implements according to the disclosed subject matter. As individualized, customized diet plans for pets have become increasingly available, such as for example with the Royal Canin® Individualis product line, the implement according to the disclosed subject matter can be tailored for the proper pet nutrition to each unique pet.

The implement 100 includes a selectively adjustable wall 300 and a handle 400 coupled with the wall, as shown in the example of FIG. 2. As depicted, the adjustable wall sits within the interior of the container. During operation, the handle can be pulled back in relation to the container to selectively adjust the wall along the side of the container at or between the graduated markings to define an intermediate predetermined volume, as further discussed below in relation to FIGS. 6-8. As such, the wall 300 serves as an intermediate end of the container opposite the front end 205 to selectively define a plurality of intermediate predetermined volumes of the container corresponding to an amount of pet food suitable for a pet with a certain weight. Accordingly, the handle 400 is coupled to the wall to selectively adjust the wall along the side of the container to define the intermediate predetermined volume and to align the wall proximate one of the graduated markings.

The handle can be constructed as monolithic with the wall or constructed as separate units that are attached together. Further, the wall can have a shape that complements the cross section of the container. As such, the perimeter surface of the wall interfaces with the internal surface of the container to permit the implement to contain wet food or water without leakage concerns. For example, the wall 300 can have the same shape as the back end 210 of the container, as depicted in FIG. 2. The adjustable wall has an edge 305 that contacts an interior of the container. The edge can comprise a wiper seal that moves more challengingly in one direction, such as direction A, and moves more easily in a second direction, such as direction B. The handle can further have a locking device to prevent movement of the adjustable wall once the adjustable wall is positioned to define the intermediate predetermined volume. Accordingly, the underside of the handle 400 can further include embossed markings serving as a locking device that can be adjustable with the back end 210 of the container.

Figure 3:
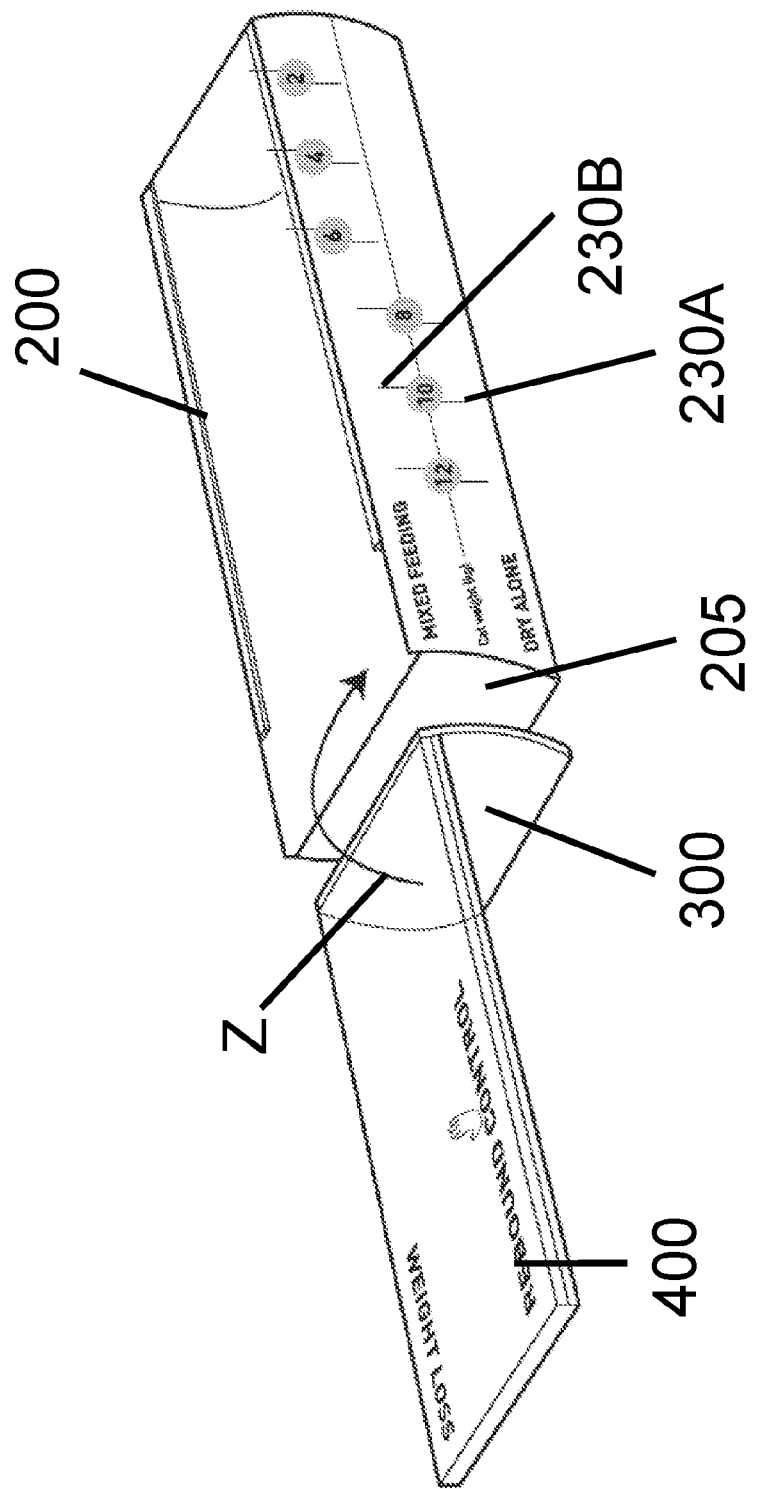
FIG. 3 is a pet food implement with the handle separable from the container, according to the disclosed subject matter.
Figure 4:
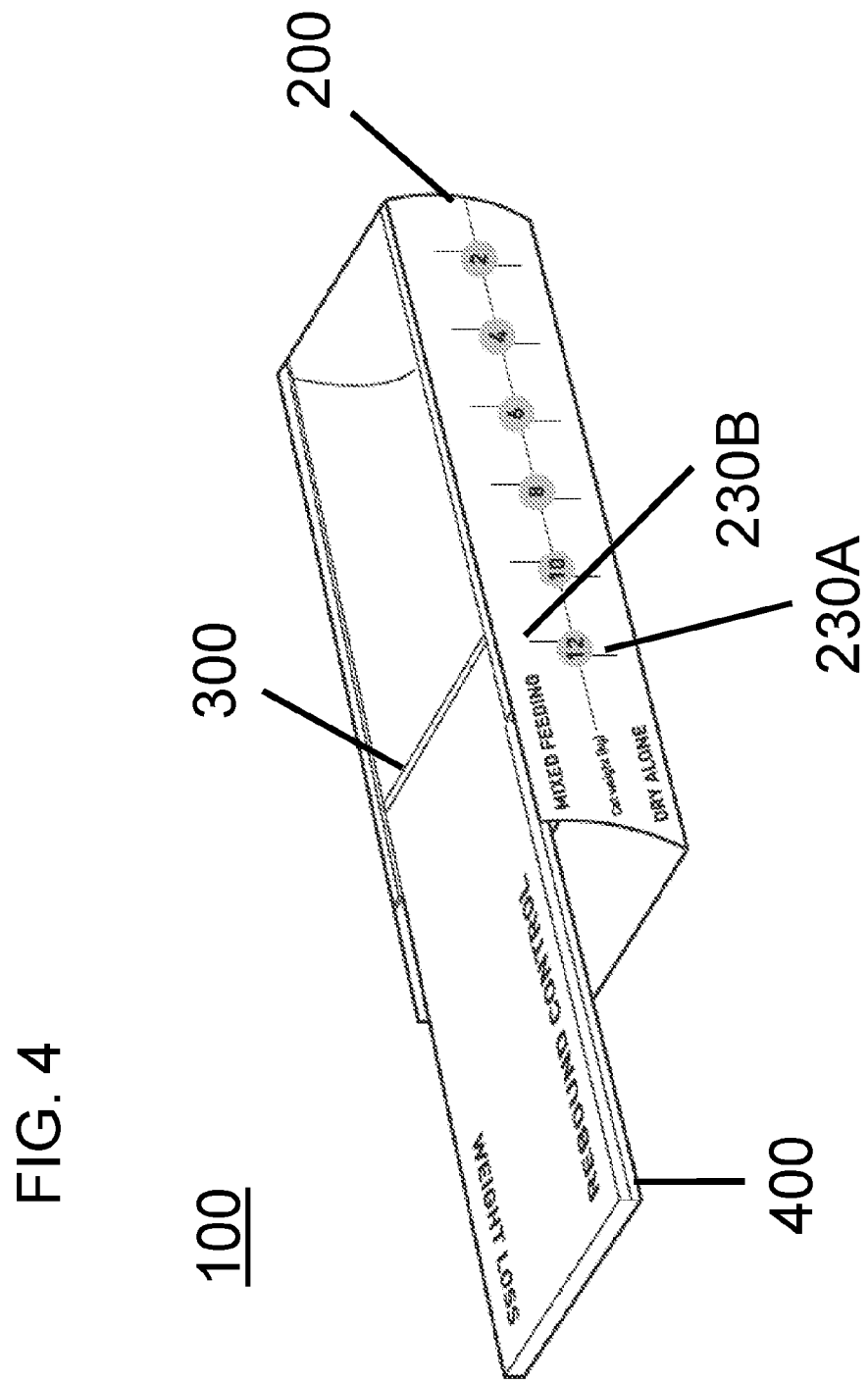
FIG. 4 is a pet food implement with the handle coupled with the container and ready for use, according to the disclosed subject matter.

FIGS. 3 and 4 show another example of the implement 100, according to the disclosed subject matter. As shown in FIG. 3, the handle 400 can be separable from the container 200 to allow for proper cleaning and disassembly (or assembly) of the implement. The handle 400 is insertable into the container as shown by the arrow Z. FIG. 4 depicts the handle 400 as inserted into the container and the implement 100 ready for use.

Figure 5:
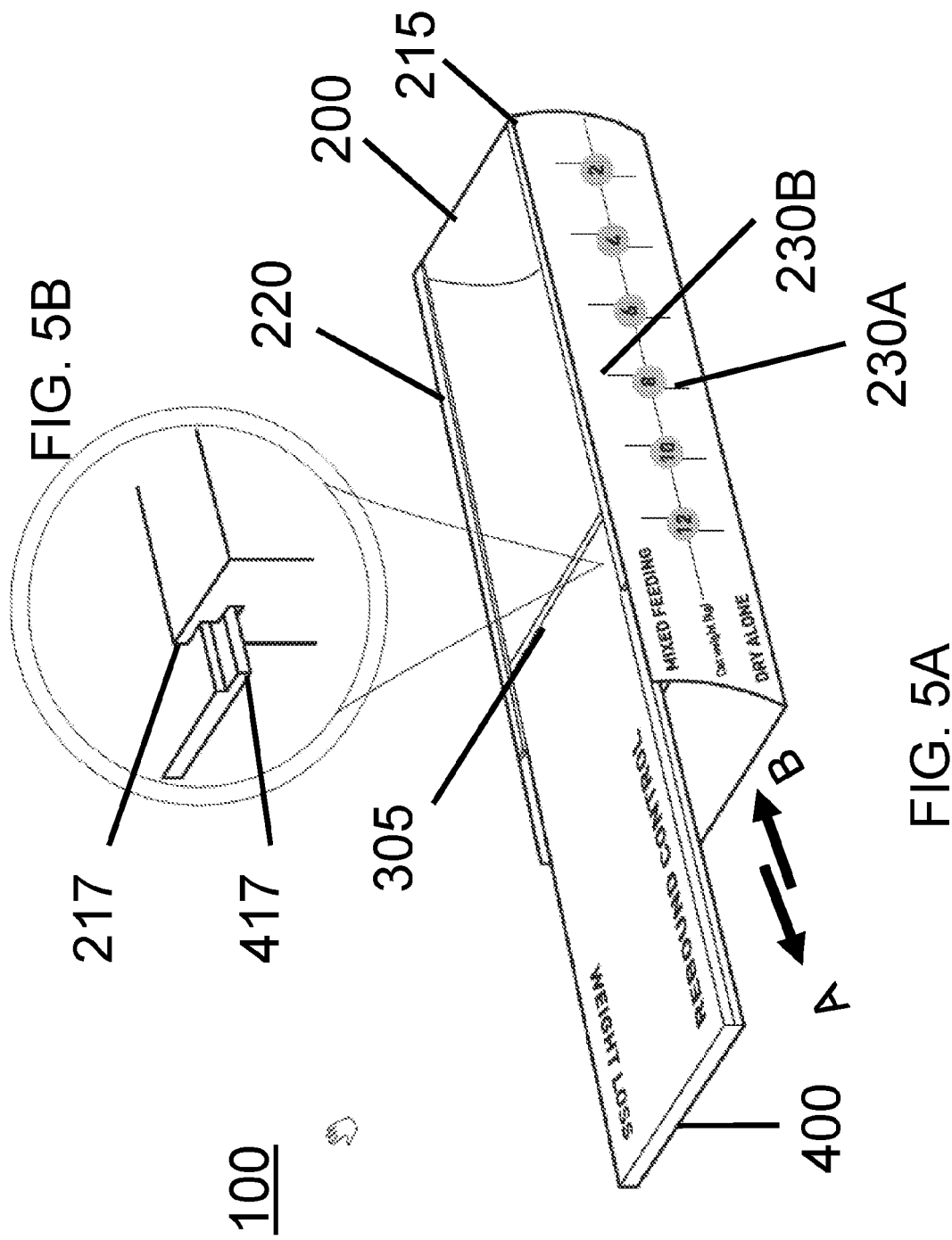
FIG. 5A is another view of the pet food implement of FIG. 4.
FIG. 5B is a detailed view of the track assembly of FIG. 5A, according to the disclosed subject matter.
Figure 6:
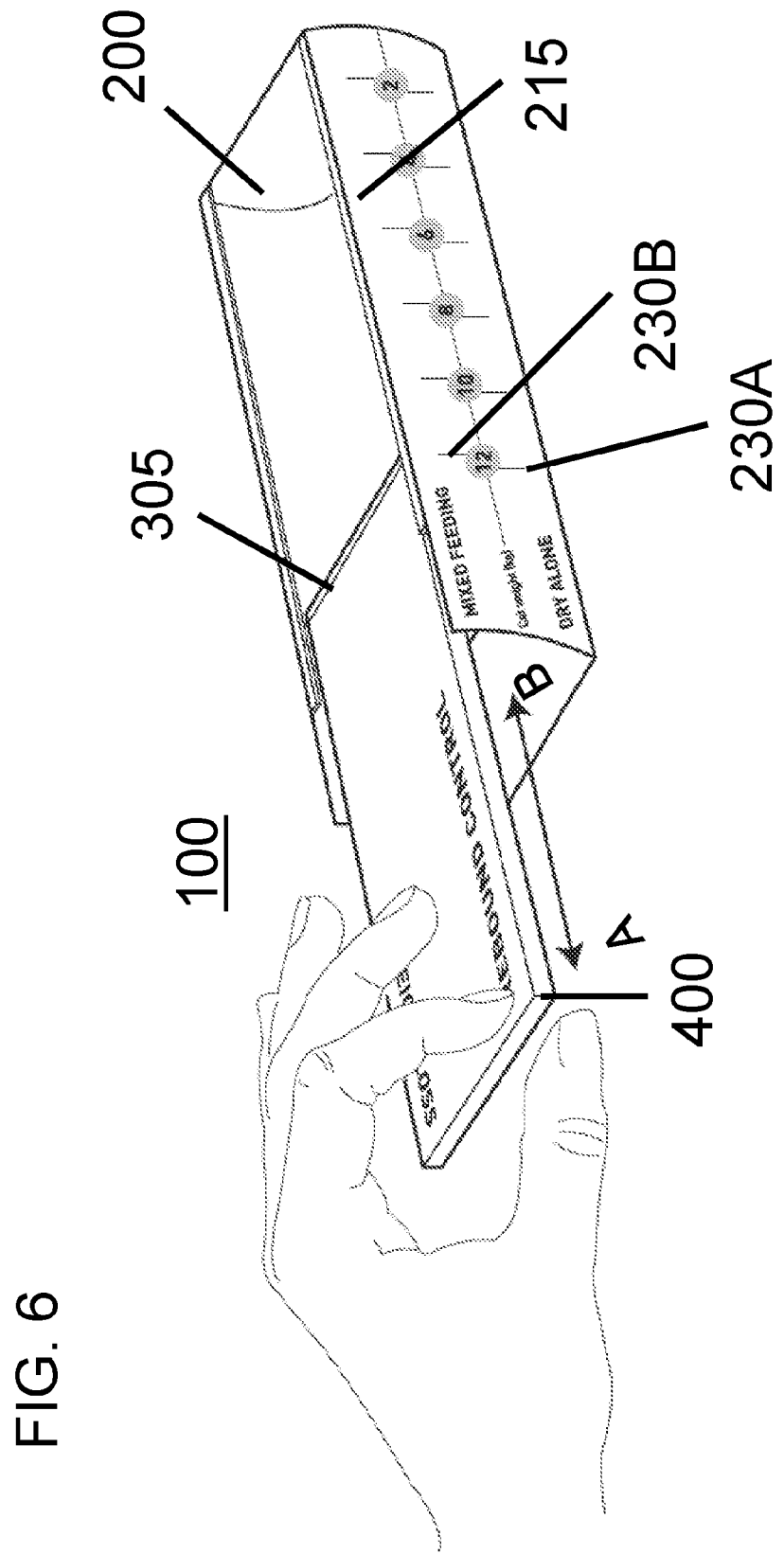
FIG. 6 is the pet food implement of FIG. 4 in a first position, according to the disclosed subject matter.
Figure 7:
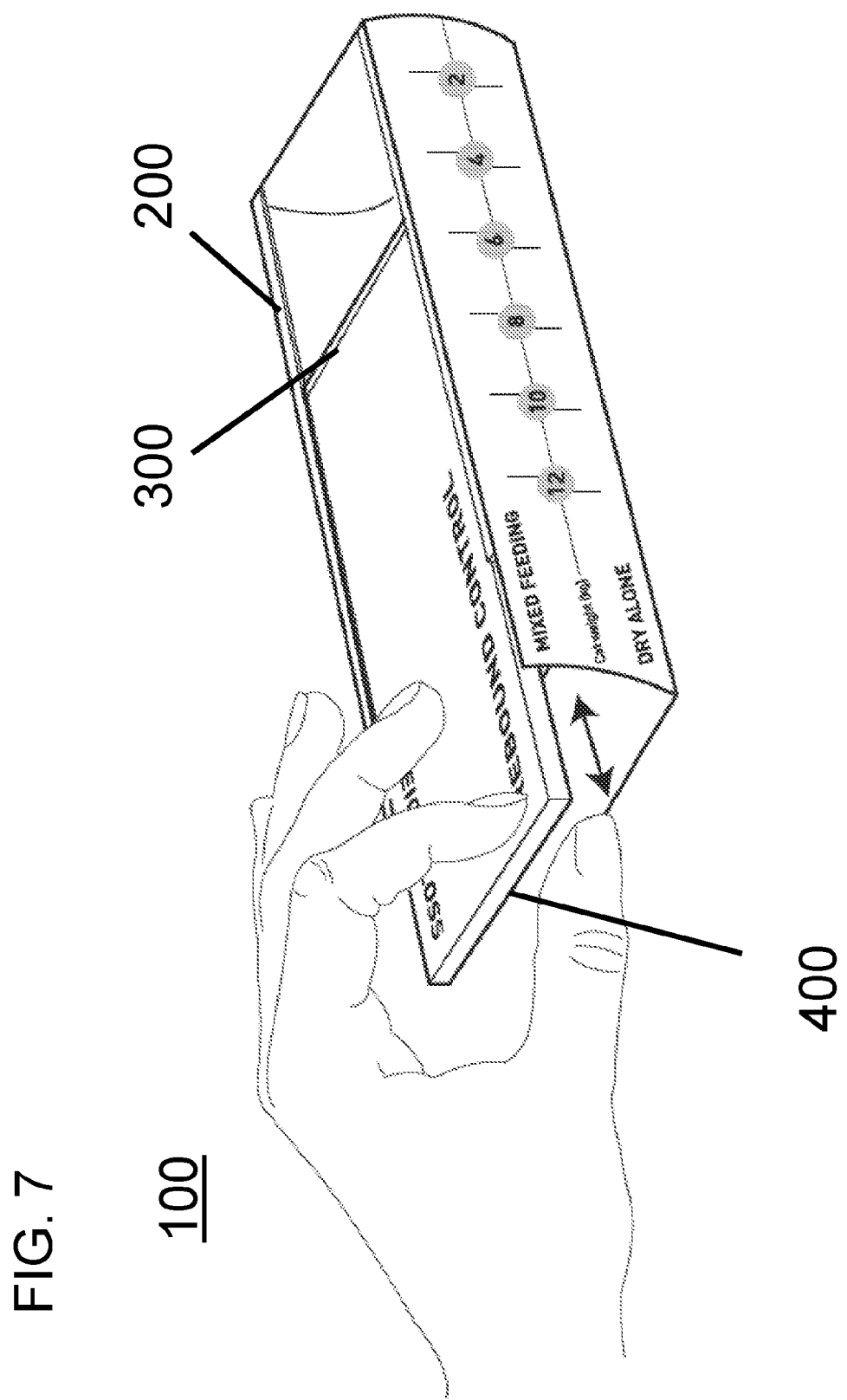
FIG. 7 is the pet food implement of FIG. 4 of a second position, according to the disclosed subject matter.
Figure 8:
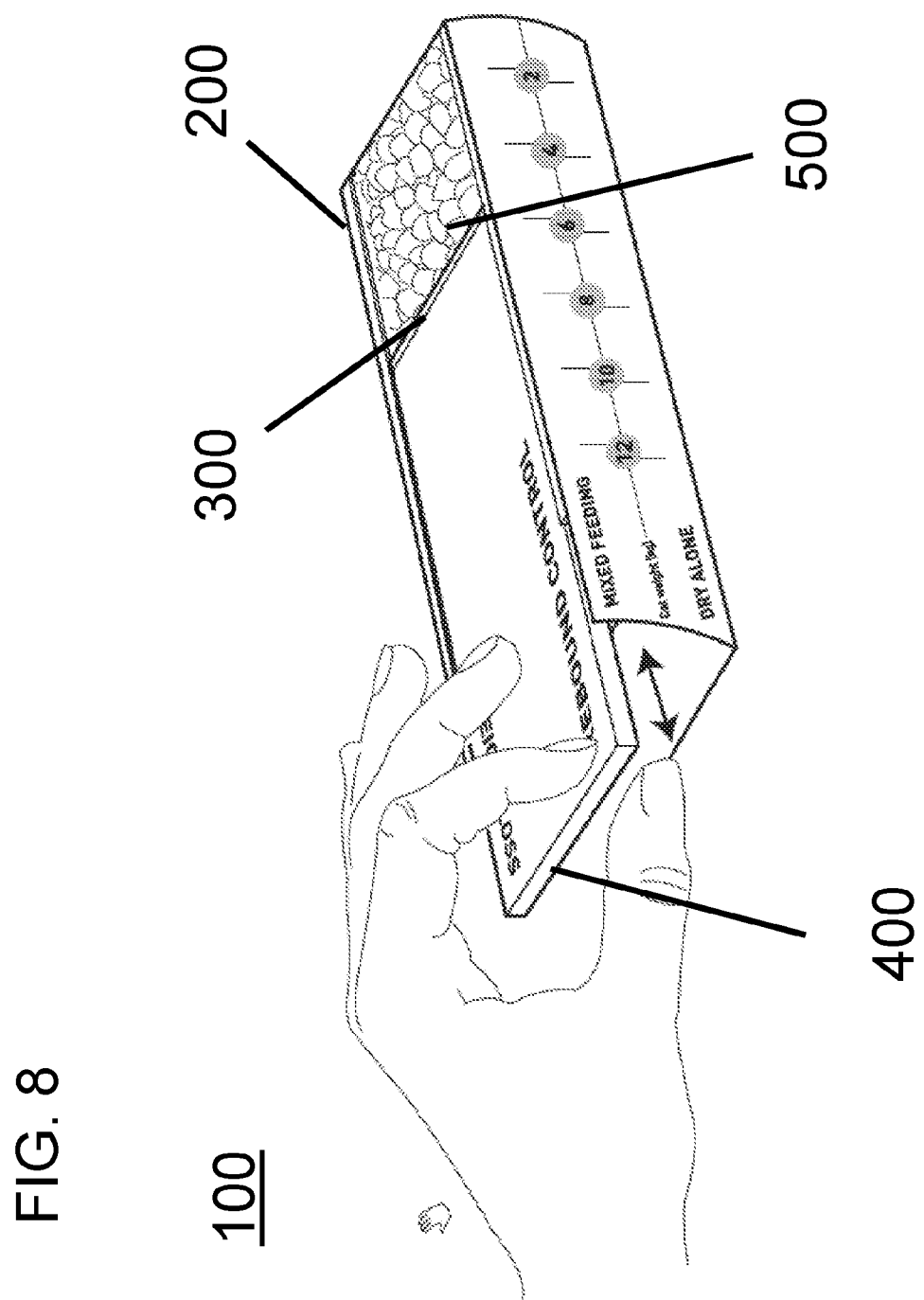
FIG. 8 is the pet food implement of FIG. 4 with pet food therein, according to the disclosed subject matter.

The handle can cooperate with the container by any suitable structure such as, but not limited to, a track assembly, as best shown in FIGS. 5A and 5B. As shown, the container can have a track assembly along the side of the container that receives the handle therein and permits the handle to interface with the track assembly to adjust the wall. As depicted in FIGS. 5A and 5B, the track assembly is positioned along each top longitudinal side 215, 220 of the container. The track assembly includes a groove structure 217 of the container and a flange 417 of the handle, such that the flange 417 is insertable with the groove structure 217, as shown. The handle 400 can slide along the track to adjust the wall to define an intermediate predetermined volume as shown in FIGS. 6-8 further discussed herein. The handle is movable in a first and second direction to adjust the wall, as shown by arrows A and B.

The container 200 can have more than one set of graduated markings. For example, the pet weight markings associated with the intermediate predetermined volumes of food can be for a pet on a diet of only dry food (i.e., a "dry alone" diet) or a pet on a diet of both dry and wet food (i.e., a "mix feeding" diet). Additionally, the sets of pet weight markings on the container (or as provided on an overlaid sticker referenced above) associated with the intermediate predetermined volumes of food can be for weight loss, weight maintenance (rebound control), and/or weight gaining programs, each of which have different volumes of food for the same pet weight. As discussed herein, the intermediate predetermined volume of food is created when the wall is aligned proximate a graduated marking for the weight of the pet corresponding to the type of diet the pet follows.

In an alternative embodiment, the implement 100 can further include a set of graduated pet weight markings for a first animal, and a second set of graduated pet weight markings for a second animal. For example, if a caretaker feeds both a cat and a dog that are on regular weight maintenance programs, one set of markings can be associated with the cat pet weight and appropriate meal portion for the cat along a first side of the implement, and another set of markings can be associated with the dog pet weight and the appropriate meal portion for the dog along a second side of the implement. As such, the caretaker can use the same implement for both a cat and a dog, given the different sets of graduated markings. Alternatively, the implement can include a set of graduated pet weight markings for a first kind of food for an animal, and a second kind of food for an animal. For example, the first kind of food can be suitable for a middle-aged dog, whereas the second kind of food can be for an aging, older dog.

As shown in FIG. 2, for purposes of example and not limitation, the implement 100 includes a first side 215 with graduated markings 230A on an interior corresponding to pet weight for a pet on a dry food only diet, as signified by the "dry alone" labeling. The implement 100 also includes graduated markings on an exterior of the first side 215 corresponding to pet weight for a pet on a diet of dry food and wet food, as signified by "mix feeding" (not shown on this side). The implement is used to measure the dry food for a pet on a mix feeding program and the pet can separately be presented with wet food according to their nutrition plan. A second side 220 of the implement 100 can further include graduated markings 230B on an exterior corresponding to pet weight for a pet on a "mix feeding" diet as shown by the "mix feeding" labeling, and an interior includes graduated markings for a pet on "dry alone" diet (not shown). As shown in FIG. 2, the handle of this example further includes labeling 410 such as "rebound control" (for weight maintenance) to signify the markings along the first side 215 are associated with weight maintenance. The handle also includes labeling 410 such as "weight loss" to signify the markings along the second side 220 are associated with weight loss programs.

Accordingly for this example of FIG. 2, the "dry alone" and "mix feeding" schedules are each provided for the weight loss program side and rebound control program side, respectively. Other marking options are contemplated herein such as altering the positions of the labeling from the container to the handle, and vice versa. For example, the handle could have one side for "dry only" diets with markings on a container side for weight loss and rebound control on the interior and exterior, with the handle having another side for "mix feeding" with markings on the container side for weight loss and rebound control on the interior and exterior. Furthermore, one side of the container, or the bottom of the container, can further include graduated markings for a pet maintenance schedule.

Although not shown, the implement can further include additional sets of graduated markings such as for weight gain that can alternatively be on either side of the handle, or can additionally be provided at another location of the handle such as along the bottom 225 of the container. Additional sets of markings corresponding to other metrics associated with defining an appropriate volume of food for a pet are as discussed and contemplated herein.

FIGS. 3-8 depict another embodiment of the disclosed subject matter. In this embodiment, each side 215, 220 of the container exterior includes unique markings for both a pet of a given weight either on a "dry alone" diet and also a pet on a "mixed feeding" diet. As shown in FIG. 4 and FIG. 6, the first side 215 is associated with pets on a rebound control diet that are either on a "dry alone" diet or a "mixed feeding" diet. Accordingly, as shown in FIG. 4, the wall 300 is aligned with the graduated marking 230B for a cat having a weight approximately 12 kg that is on a mixed feeding diet. The second side 220 is associated with pets on a weight loss diet as indicated by the handle designation and includes graduated markings (not shown) for pets of a given weight on either "dry alone" diets or "mixed feeding" diets.

The graduated markings 230 can be spaced apart at the appropriate distance to create the corresponding intermediate predetermined volume of food with a given pet weight, as discussed herein. As such, the distance between markings can be consistent or can vary. Consecutive markings can be any appropriate graduated spacing suitable for the kind of pet. For example, the pet weight markings can be every ½ kilogram, every kilogram, or every 2 kilograms, depending on the implement for the kind of pet or animal. For example, a cat implement may include markings every ½ kilogram, whereas a horse implement may include markings every 5 kilograms. As shown in the examples of FIGS. 3-8, the graduated markings are every 2 kilograms, from 2 kg to 12 kg.

The implement can include any suitable labeling and information to assist a caretaker in using the implement. As such, the container can include numbers, symbols, signs, and text. Furthermore, the handle can include labeling or any supplemental information to further explain the operation of the implement. In the embodiment of FIG. 2, the handle includes a silhouette of a cat to signify the implement being particular for a cat. In the embodiment of FIGS. 3-8, the implement has text labeling that denotes "cat weight kg," as shown. The "cat weight kg" labeling along the X axis reminds the caretaker to align the wall with the current cat weight markings along the container side. Alternatively or additionally, other units can be printed on the implement, such as pounds (lbs).

The implement can be constructed of any suitable material, such as but not limited metal or plastic. The container and the handle can be constructed of the same or different materials.

The implement can include any suitable shape that facilitates movement between the wall and the container. For example, the exterior of the container can be in the form of a cat with the handle being in the form of a backbone ridge and tail. In another example, the implement for a cat can be in the form of a mouse with the handle being in the form of a tail. Alternatively, the implement can have anthropomorphic features.

In another embodiment, the markings of the implement can be color coded to correspond with product associated with a certain pet. In such embodiment, the implement can include several sets of markings at different graduation scales printed in specific colors associated with different products. For example, one set of graduated markings can be printed in blue color as being associated with Royal Canin® Medium Puppy dry dog food, which is packaged in a blue color. Another set of graduated markings can be printed in red color on the implement as being associated with Royal Canin Medium® Adult dry dog food, which is packaged in a red color. Furthermore, the graduated markings can be printed on the same implement for different animals, such as cats and small dogs. The cat graduated markings can be printed in colors associated with certain branded cat foods and the dog graduated markings can be printed in colors associated with certain branded dog foods.

In yet another embodiment, the markings of the implement can alternatively be provided on an attachable sticker or decal that can be selectively adhered to the container or to the handle, as referenced above. The container or handle can include a color coding scheme or other identifiable information to inform a user where to align the attachable sticker to the implement. As such, the same implement can be used for several different pets or breeds as described above. The sticker can be reusable. The sticker can furthermore include any of the variations mentioned herein with the implement such as including a "dry alone" portion in addition to a "mixed feeding" portion with appropriate markings for an individualized, customized diet plan.

Methods of utilizing the implement of the disclosed subject matter are contemplated herein. In one embodiment, a method of using a pet food implement is disclosed, comprising amongst other things, providing a pet food implement having a container to measure an amount of pet food based on a weight measurement of a pet and a weight management plan, the container having a side with graduated markings corresponding to weight measurements for pets, a selectively adjustable wall that defines an intermediate predetermined volume of the container corresponding to an amount of pet food suitable for a pet with a certain weight on a predetermined weight management plan; and a handle coupled to the wall; selectively adjusting the wall along the side of the container to define the intermediate predetermined volume, the handle aligning the wall proximate one of the graduated markings; and using the implement to fill the intermediate predetermined volume with pet food.

As shown by the progression of FIGS. 6-8, the handle can be easily adjusted by a caretaker to align the wall 300 with the appropriate cat weight for a pet. The handle is movable along the track assembly in the direction of arrows A and B. As shown in FIGS. 6 and 7, the caretaker has moved the handle from a first position at a cat weight of 12 kg to a second position at a cat weight of approximately 6 kg on a mixed feeding diet. In some embodiments, the handle can be locked once in the desired position. With the position set in FIG. 7, the caretaker can dip the spoon into a cat food bag to measure the appropriate amount of cat food to fill the intermediate predetermined volume for the given pet. FIG. 8 depicts the implement as retaining the cat food 500 for the intermediate predetermined volume.

The Table 1.0 below is an exemplary rationing table that provides illustrative quantities of food given to cats (in weight kg) during the relevant period as well as the differences of food given for weight loss period and maintenance diets.

TABLE 1.0

| | Overweight cats | | | Rebound control step (maintenance) | | |
|---|---|---|---|---|---|---|
| | DRY ONLY | MIX FEEDING | | DRY ONLY | MIX FEEDING | |
| Cat's weight | kibbles (g) | kibbles (g) | Pouch | kibbles (g) | kibbles (g) | Pouch |
| 2 | 30 | 12 | 1 | 37 | 20 | 1 |
| 3 | 40 | 22 | 1 | 50 | 34 | 1 |
| 4 | 45 | 27 | 1 | 61 | 46 | 1 |
| 5 | 55 | 35 | 1 | 72 | 58 | 1 |
| 6 | 60 | 42 | 1 | 82 | 69 | 1 |
| 7 | 70 | 49 | 1 | 91 | 80 | 1 |
| 8 | 75 | 56 | 1 | 100 | 90 | 1 |
| 9 | 80 | 63 | 1 | 109 | 100 | 1 |
| 10 | 85 | 69 | 1 | 117 | 110 | 1 |

In the embodiments outlined in Table 1.0, the implement measures only dry food based on Dry Only diets and Mix Feeding diets. For the Mix Feeding diet plan, these diets are formulated on consistently feeding 1 wet unit (can or pouch) for all pet weights, so the only variable that needs to be measured is the dry food kibble.

While the disclosed subject matter is described herein in terms of certain example embodiments, those skilled in the art will recognize that various modifications and improvements can be made to the disclosed subject matter without departing from the scope thereof. Additional features known in the art likewise can be incorporated with the disclosed subject matter. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Furthermore, although reference is made to felines in the examples throughout this disclosure, other pets can utilize the food dispensing device, systems and methods herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the device, system and method of the disclosed subject matter without departing from the spirit or scope of the disclosed subject matter. Thus, it is intended that the disclosed subject matter include modifications and variations that are within the scope of the appended claims and their equivalents.

What is claimed is:

1. A pet food implement, comprising:
   a container to measure an amount of pet food based on a weight measurement of a pet and a weight management plan, the container having a side with graduated markings corresponding to weight measurements for pets ranging up to a maximum weight;
   a selectively adjustable wall that defines an intermediate predetermined volume of the container corresponding to an amount of pet food suitable for a pet with a certain weight on a predetermined weight management plan; and
   a handle coupled to the wall to selectively adjust the wall along the side of the container to define the intermediate predetermined volume, the handle aligning the wall proximate one of the graduated markings,
   wherein the graduated markings include a first set of markings and a second set of markings, wherein the first set of markings is associated with a pet having a diet of dry food and the second set of markings is associated with a pet having a mix feeding diet of dry food and wet food.

2. The pet food implement of claim 1, wherein the container has a maximum volume associated with the maximum weight of a pet, wherein the intermediate predetermined volume does not exceed the maximum volume.

3. The pet food implement of claim 1, wherein the pet food implement is associated with cat food and the graduated markings corresponding to weight measurements for cats ranging up to 12 kg.

4. The pet food implement of claim 1, wherein the pet food implement is associated with dog food and the graduated markings corresponding to weight measurements for dogs ranging up to 150 kg.

5. The food dispenser of claim 1, wherein the intermediate predetermined volume corresponds to a meal portion for a pet that is on the weight management program comprising at least one of a weight loss program, a weight maintenance program, or a weight gaining program.

6. The pet food implement of claim 1, wherein the adjustable wall has an edge that contacts an interior of the container and the handle has a locking device to prevent movement of the adjustable wall once the adjustable wall is positioned to define the intermediate predetermined volume.

7. The pet food implement of claim 1, wherein the graduated markings are spaced at a distance apart to define the intermediate predetermined volume of a dry food when the wall is aligned proximate a graduated marking.

8. The pet food implement of claim 1, wherein the container further comprises a second side with graduated markings corresponding to weight measurements for pets, wherein the graduated markings of the second side are associated with a weight management plan different from the weight management plan of the first side, wherein the wall is aligned proximate a graduated marking of the second side to define the intermediate predetermined volume for dry food for the pet.

9. The pet food implement of claim 1, wherein the weight management plan of the first side comprises a rebound control plan and the weight management plan of the second side comprises a weight loss plan.

10. The pet food implement of claim 1, wherein the wall is aligned proximate a graduated marking of the side to define the intermediate predetermined volume for pet food for a cat.

11. A pet food implement comprising:
    a container to measure an amount of pet food based on a weight measurement of a pet and a weight management plan, the container having a first side with graduated markings corresponding to weight measurements for pets ranging up to a maximum weight and a second side with graduated markings corresponding to weight measurements for pets;
    a selectively adjustable wall that defines an intermediate predetermined volume of the container corresponding to an amount of pet food suitable for a pet with a certain weight on a predetermined weight management plan, wherein the wall is aligned proximate a graduated marking of the second side to define the intermediate predetermined volume for pet food for a dog; and
    a handle coupled to the wall to selectively adjust the wall along the side of the container to define the intermediate predetermined volume, the handle aligning the wall proximate one of the graduated markings, wherein the wall is aligned proximate a graduated marking of the first side to define the intermediate predetermined volume for pet food for a cat.

12. The pet food implement of claim 1, wherein the container has a track along the side and the handle interfaces with the track to adjust the wall.

13. The pet food implement of claim 1, wherein the handle is movable in a first and second direction to adjust the wall.

14. The pet food implement of claim 1, wherein the handle includes labeling to indicate a meaning of the graduated markings along the side of the container.

15. The pet food implement of claim 1, wherein the container comprises at least one of plastic or metal.

16. The pet food implement of claim 1, wherein the handle comprises at least one of plastic or metal, wherein the handle comprises a material different than the container.

17. The pet food implement of claim 1, wherein the handle is removable.

18. A pet food implement comprising:
- a container to measure an amount of pet food based on a weight measurement of a pet and a weight management plan, the container having a side with graduated markings corresponding to weight measurements for pets ranging up to a maximum weight;
- a selectively adjustable wall that defines an intermediate predetermined volume of the container corresponding to an amount of pet food suitable for a pet with a certain weight on a predetermined weight management plan;
- a handle coupled to the wall to selectively adjust the wall along the side of the container to define the intermediate predetermined volume, the handle aligning the wall proximate one of the graduated markings, and
- a sticker coupleable with the container, wherein the sticker includes the graduated markings corresponding to weight measurements for pets ranging up to a maximum weight.

* * * * *